June 12, 1928.  
A. E. PAIGE  
1,673,017  
RADIATOR  
Filed Oct. 19, 1926
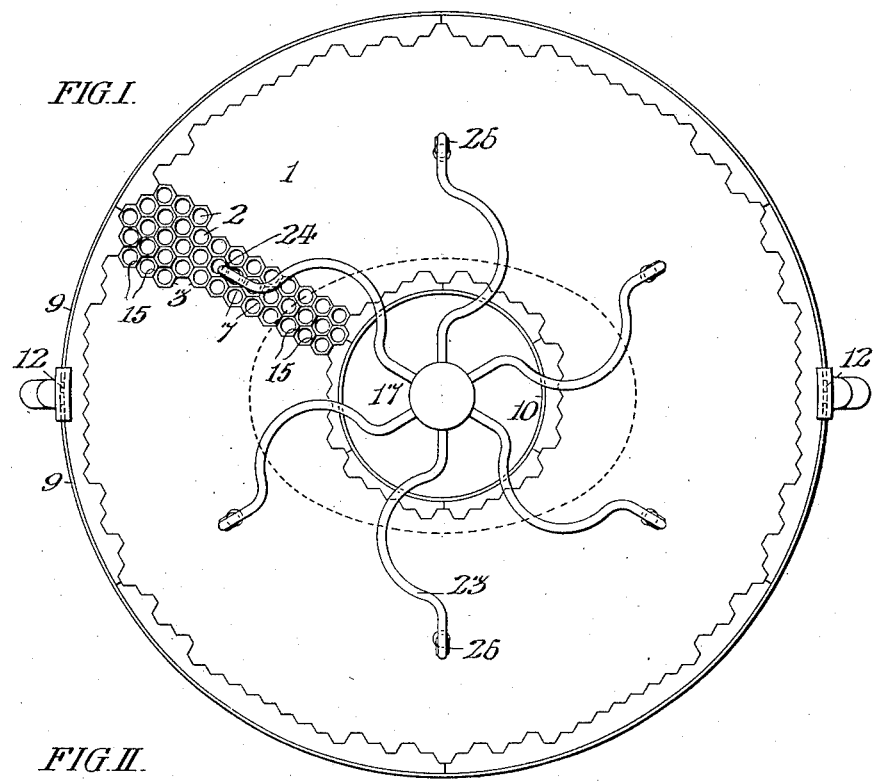
FIG.I.
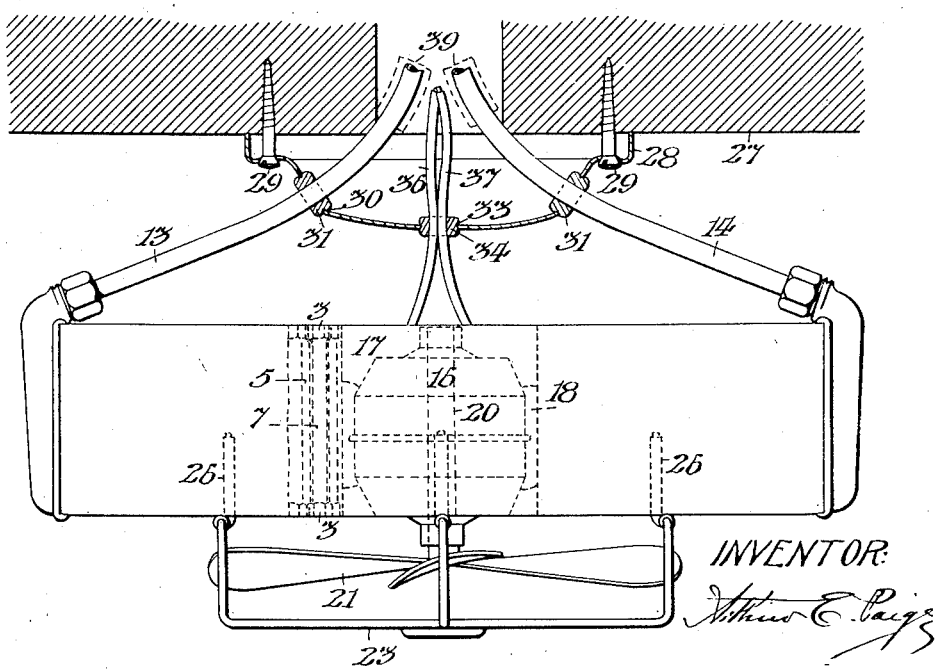
FIG.II.
INVENTOR:  
Arthur E. Paige Patented June 12, 1928.

1,673,017

UNITED STATES PATENT OFFICE.

ARTHUR E. PAIGE, OF PHILADELPHIA, PENNSYLVANIA.

RADIATOR.

Application filed October 19, 1926. Serial No. 142,575.

It is the object and effect of my invention to provide a radiator of cellular structure, including thin sheet metal walls, preferably copper, forming separate passageways for a heat carrying fluid and a heat absorption fluid and means for forcing circulation of fluid through said cellular structure.

As hereinafter described, my invention includes a cellular structure comprising an annular congeries of metal tubes having enlarged polygonal ends which fit together; casing bands at the inner and outer edges of said congeries; means sealing the joints between the ends of said tubes and said casing means, forming a cellular honeycomb of thin metal walls comprising separate passageways for hot water or steam, and for atmospheric air; means forming an inlet port and an outlet port in communication with the passageways for the heating medium; an electric motor, mounted in the axial opening in said annular congeries; and a fan connected with said motor, adjacent to one end of said tubes, arranged to circulate air through the air passageways of said congeries.

In such a structure; there is a tendency for the fan to transmit vibrations to the cellular structure and generate sound which it is desirable to suppress. Therefore, adjunctive features of my invention are means for suspending or otherwise supporting said structure in spaced relation with a wall including means for limiting the transmission of such vibration. As hereinafter described, such supporting means includes a wall bracket having means to rigidly connect it with a wall and having means to flexibly engage the pipes leading to and from said cellular structure and also the electric conductors leading to the fan motor.

My invention includes the various novel features of construction and arrangement hereinafter more definitely specified.

In said drawings; Fig. I is an outer face view of a radiator and its appurtenances embodying my invention; the fan being omitted.

Fig. II is a diametrical sectional view of the structure shown in Fig. I.

In said figures; the cellular structure 1 includes congeries of individual tubes 2 which are primarily cylindriform but have their ends 3 enlarged to polygonal, and preferably hexagonal, form; so that when said ends are fitted together, the cylindriform bodies of the tubes are in spaced relation to afford passageways 5 around and between them for the heating medium. Each of said tubes forms a passageway 7, extending axially through it, for atmospheric air, such air passageways, of course, being separated by the wall of said tubes, from the passageways around the tubes which contain the heating medium.

I find it convenient to provide said cellular structure with casing means including band sections 9 of sheet metal at the outer circumferential edge of the structure, and a single band 10 at the inner circumferential edge of said structure, and to provide inlet and outlet port fittings 12 at the joints between said band sections, having means for connection with respective pipes 13 and 14; preferably of the pinch fitting type; which encircle the pipes and seal the joints between them and the radiator, without the necessity of screw threading the pipes.

The joints between the edges of said tubes 2 and said casing bands and port fittings are conveniently sealed by dipping the assembled parts into molten half and half solder or other suitable metal capable of uniting them, as indicated at 15 in Fig. I.

The electric motor 16 is mounted in the axial opening 17 in said annular congeries; preferably with a bushing 18 of resilient rubber or other vibration suppressing material interposed between the cellular structure and the motor to suppress or limit the transmission of vibrations between them. The armature shaft 20 of said motor is provided with the fan wheel 21 adjoining one end of the congeries of tubes, and I prefer to provide said fan with a guard 23, conveniently formed of a cage of wires having ends 24 bent to fit in and frictionally engage certain of the tubes 2; as indicated in Fig. I. In order to suppress or limit the transmission of vibrations from the motor to said guard and rattling of the latter; I cover the wire ends 24 with small rubber tubes 26 which frictionally, but detachably, engage said tubes 2.

In order to permit free circulation of the atmospheric air with respect to said radiator; I prefer to support the latter in spaced relation with the wall 27; which may be a ceiling or a side wall. Such supporting means may include the bracket 28, conveniently formed of pressed sheet metal, having means for rigidly connecting it with said wall, for instance, screws 29. Said bracket has openings 30 provided with rubber or other suitable anti-vibration bushings 31 to embrace said pipes 13 and 14; which thus serve to suspend said cellular radiator structure. I also find it convenient to provide said bracket with the opening 33 having the anti-vibration bushing 34 arranged to embrace the electric conductors 36 and 37 through which said fan motor is energized. As indicated in Fig. II; said pipes 13 and 14 are preferably provided with heat insulating coverings 39, which may be of any suitable character; and said pipes 13 and 14 and said electric conductors 36 and 37 may be gathered together to extend through a single conduit in said wall.

I do not desire to limit myself to the precise details of construction and arrangement herein set forth, as it is obvious that various modifications may be made therein without departing from the essential features of my invention, as defined in the appended claims.

I claim:

1. In a radiator, the combination with an annular congeries of metal tubes, having enlarged polygonal ends; of casing bands at the inner and outer edges of said congeries; means sealing the joints between the ends of said tubes and said casing means, forming a cellular honeycomb of thin metal walls comprising separate passageways for a heat carrying fluid and a heat absorption fluid; means forming an inlet port and an outlet port in communication with the passageways for said heat carrying fluid; an electric motor, mounted in the axial opening in said annular congeries; and a fan connected with said motor, adjacent to one end of said tubes, arranged to circulate the heat absorption fluid through said congeries; and means supporting the same including pipes leading to and from said ports.

2. In a radiator, the combination with an annular congeries of metal tubes, having enlarged polygonal ends; of casing bands at the inner and outer edges of said congeries; means sealing the joints between the ends of said tubes and said casing means, forming a cellular honeycomb of thin metal walls comprising separate passageways for a heat carrying fluid and a heat absorption fluid; means forming an inlet port and an outlet port in communication with the passageways for said heat carrying fluid; an electric motor, mounted in the axial opening in said annular congeries; a fan connected with said motor, adjacent to one end of said tubes, arranged to circulate the heat absorption fluid through said congeries; and means supporting the same, including a wall bracket and flexible means connecting said structure with said bracket.

3. In a radiator, the combination with an annular congeries of metal tubes, having enlarged polygonal ends; of casing bands at the inner and outer edges of said congeries; means sealing the joints between the ends of said tubes and said casing means, forming a cellular honeycomb of thin metal walls comprising separate passageways for a heat carrying fluid and a heat absorption fluid; means forming an inlet port and an outlet port in communication with the passageways for said heat carrying fluid; an electric motor, mounted in the axial opening in said annular congeries; a fan connected with said motor, adjacent to one end of said tubes, arranged to circulate the heat absorption fluid through said congeries; and means interposed between said motor and said congeries adapted to check the transmission of vibrations between them.

4. In a radiator, the combination with an annular congeries of metal tubes, having enlarged polygonal ends; of casing bands at the inner and outer edges of said congeries; means sealing the joints between the ends of said tubes and said casing means, forming a cellular honeycomb of thin metal walls comprising separate passageways for a heat carrying fluid and a heat absorption fluid; means forming an inlet port and an outlet port in communication with the passageways for said heat carrying fluid; an electric motor, mounted in the axial opening in said annular congeries; a fan connected with said motor, adjacent to one end of said tubes, arranged to circulate the heat absorption fluid through said congeries; and a guard for the fan and means interposed between said guard and said congeries adapted to limit the transmission of vibrations between them.

5. In a radiator, the combination with a congeries of metal tubes, having enlarged polygonal ends; of a casing for the perimeter of said congeries comprising band sections of sheet metal; inlet and outlet port fittings at the joints between said band sections having means for connection with respective pipes; and means sealing the joints between the ends of said tubes, said band sections, and said port fittings.

6. A structure as in claim 5, wherein the port fittings are provided with screw means arranged to encircle and pinch the respective pipes, to seal the joints between the radiator and said pipes.

In testitmony whereof, I have hereunto signed my name at Philadelphia, Pennsylvania, this eleventh day of September, 1926.

ARTHUR E. PAIGE.